United States Patent [19]

Kannan et al.

[11] Patent Number: 4,981,113
[45] Date of Patent: Jan. 1, 1991

[54] DEAERATOR TRAY FOR A STEAM BOILER FEEDWATER HEATER SYSTEM

[75] Inventors: Raghavachari Kannan, Newtown Square; John T. Stevenson, Skippack, both of Pa.

[73] Assignee: Crane, Co., New York, N.Y.

[21] Appl. No.: 518,934

[22] Filed: May 4, 1990

[51] Int. Cl.$^5$ .................. F22D 1/28; F22D 1/32; F22D 1/40
[52] U.S. Cl. .................. 122/441; 55/244; 55/263; 122/442; 122/492; 261/DIG. 10; 261/DIG. 44; 261/114.1
[58] Field of Search ............... 261/DIG. 10, DIG. 13, 261/DIG. 44, DIG. 76, 108, 114.1, 111; 122/441, 442, 443, 492; 55/243, 244, 462

[56] References Cited

U.S. PATENT DOCUMENTS

| | | | |
|---|---|---|---|
| 533,523 | 2/1895 | Brancher | 122/443 |
| 669,667 | 3/1901 | Smith | 122/443 |
| 2,398,345 | 4/1946 | Cooper | 261/108 |
| 3,647,191 | 3/1972 | Fordyce | 261/111 |
| 3,761,064 | 9/1973 | Selway | 261/108 X |
| 3,803,997 | 4/1974 | Van Raden | 98/115 |
| 4,164,399 | 8/1979 | Kannapell | 55/223 |
| 4,288,393 | 9/1981 | Sekiguchi et al. | 261/108 |
| 4,601,731 | 7/1986 | Michelson | 55/1 |
| 4,759,315 | 7/1988 | Chiou et al. | 122/442 |

Primary Examiner—Edward G. Favors
Attorney, Agent, or Firm—Woodcock, Washburn, Kurtz, Mackiewicz & Norris

[57] ABSTRACT

A deaerator tray in the form of a horizontally elongated trough for receiving a quantity of liquid to be deaerated. The trough has a flat bottom having a pair of spaced, elongated sides having upper liquid overflow edges. Guide structure is provided for directing the flow of liquid overflowing from the edges, the guide structure includes a pair of flat elongated inclined wall members each directly connected to a respective one of the sides below the upper liquid overflow edges along the length thereof. The wall members extend outwardly away from each other and downwardly away from the respective upper liquid overflow edges. Each wall member is inclined relative to the vertical and terminates in a lower edge to enhance deaeration of the liquid as the latter is guided down the wall members and falls from the lower edge. The sides of the tray are inclined outwardly and upwardly at an angle from the horizontal and the wall members and the sides cooperate to form opposed V-shaped structures extending along a plane formed by the opposite edges of the bottom.

12 Claims, 2 Drawing Sheets

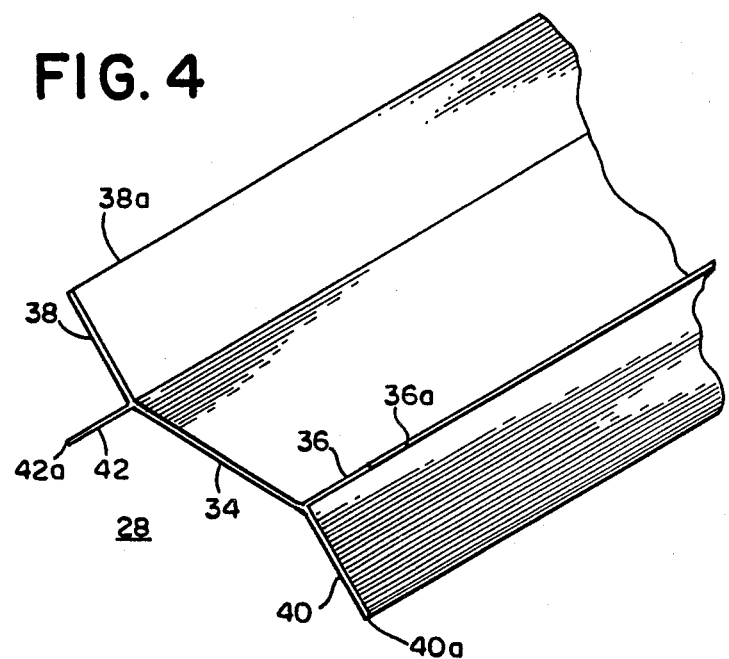
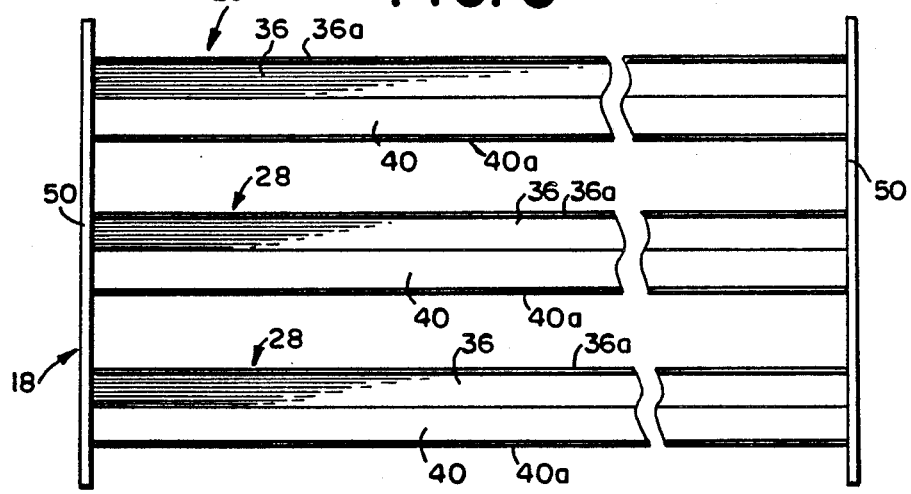

DEAERATOR TRAY FOR A STEAM BOILER FEEDWATER HEATER SYSTEM

BACKGROUND OF THE INVENTION

This invention relates to a deaerator tray and tray assembly for a steam boiler feedwater heater system. Deaerator systems are well known in the art and are used for removable of corrosion causing gases such as oxygen and carbon dioxide that are dissolved within the feedwater of steam systems. An example of such system is described and illustrated in U.S. Pat. No. 4,759,315 such disclosure being incorporated herein by this reference thereto. In that patent there is illustrated in FIG. 5 a prior art deaerator tray assembly using rectangular troughs in the form of trays having a flat bottom and vertical side walls. The trays are elongated and are stacked in a staggered and spaced relation. It has been found that some of the feedwater overflowing from the upper trays down through the stack adheres due to surface tension to the underside of the bottoms of the troughs and drops from the latter near the center which results in water by-passing the underlying trays. For example, due to the effect of surface tension some of the water from the trays in the first horizontal row will miss the trays in the second horizontal row and will cascade directly into the trays in the third horizontal row. This water is said to "by-pass" the trays. As the steam from below rises up, it will try to flow across the water which is cascading down from tray to tray. When the water by-passes the trays, steam will miss that amount of water and this will result in poor heat transfer, decreasing the efficiency of the tray system.

In the process of deaeration, in order to obtain maximum heat transfer, steam must be intimately mixed with the water which must be distributed in the form of uniform thin film. In current technology, water is allowed to cascade down through several rows of trays. Steam is fed from below and when the steam comes in contact with the water, which is cascading in the form of a curtain, heat transfer takes place. The efficiency of the heat transfer greatly depends on two factors, namely surface tension in the water and consequently water by-passing the trays below.

Various tray geometry has been utilized to overcome the problem of surface tension and the resulting by-passing of the water thereby reducing the efficiency of heat transfer. As pointed out above, the prior art has utilized rectangular shaped trays or troughs. The prior art has also used a tray geometry where the bottoms of the trays are flat and the side walls vertical but the side walls make a small curve with respect to the bottom. This small curve or bend assists the water in traveling easily to the underside of the tray and thus increases the tendency for the water to by pass the lower trays. In an attempt to overcome this problem V-shaped troughs or trays have been utilized and as pointed out in the aforesaid U.S. Pat. No. 4,759,315 the V-shaped troughs have been provided with downwardly and outwardly inclined wing-like guide structure connected to the upper weir edges of the troughs. The lower edges of the guide structure are notched, presenting a plurality of liquid guiding extensions. While this configuration for the deaerator tray structure has represented an improvement over the prior art it has still left something to be desired.

SUMMARY OF THE INVENTION

The deaerator tray of the present invention substantially eliminates the effect of surface tension in the water flow resulting in a maximum heat transfer. Because of the high efficiency of heat transfer, the new and improved deaerator tray design permits the use of a smaller tray stack which consequently results in a smaller vessel with lower costs. While the present invention is described in connection with a process of deaeration in order to obtain maximum heat transfer between steam and water it is to be understood that this invention can be used in any application where it is desired to intimately mix any vapor with any liquid such for example as in degasification.

In accordance with the present invention there is provided a deaerator tray assembly for countercurrent contact of steam system feedwater with uprising steam vapor. The assembly includes a plurality of horizontally elongated troughs for receiving a quantity of the feedwater to be deaerated. The troughs each have a bottom and a spaced pair of sides terminating in upper spilling edges. The troughs are arranged in spaced side-by-side relation in horizontal tiers. The tiers are vertically spaced and staggered from each other. A plurality of flat inclined wall members are provided with each one being directly connected to one of the sides of the troughs below the upper spilling edges. The wall members extend outwardly and downwardly from the respective sides of the troughs and terminate in a lower edge thereby causing the water falling from the lower edge of the wall members to be deflected toward the underlying troughs.

In accordance with another aspect of the invention there is provided a deaerator tray having horizontally elongated trough means for receiving a quantity of liquid to be deaerated. The trough means has a pair of spaced elongated sides having upper liquid overflow edges. Guide structure is provided for directing the flow of liquid overflowing from the edges. The guide structure comprises a pair of flat elongated inclined wall members each directly connected to a respective one of the sides below the upper liquid overflow edges along the length thereof. The wall members extend outwardly away from each other and downwardly away from the respective liquid overflow edges. Each wall member is inclined relative to the vertical and terminates in a lower edge to enhance deaeration of the liquid as the latter is guided down the wall members and falls from the lower edge. The pair of flat wall members have straight lower edges for guiding the liquid from one tray to another.

BRIEF DESCRIPTION OF THE DRAWINGS

FIG. 3 is a side elevational view of the tray assembly shown in FIG. 2 with parts broken away.

FIG. 4 is a fractional perspective view on enlarged scale of a single trough of the present invention.

DETAILED DESCRIPTION OF THE INVENTION

Figure 1:
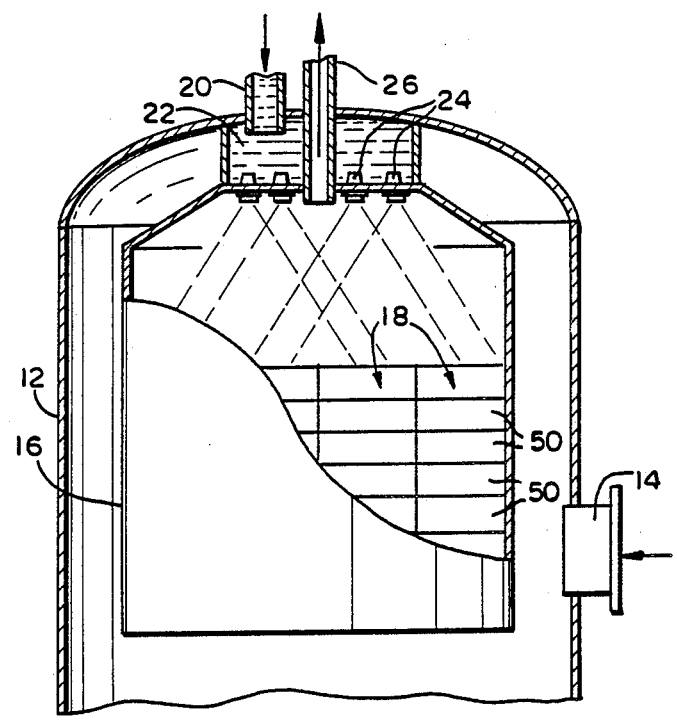
FIG. 1 is an end sectional view of a two-stage deaerator with parts broken away for clarity showing a plurality of tray stacks or assemblies embodying the invention and mounted within a deaerator housing.

Referring to FIG. 1 there is shown a deaerator 10 having an outer housing 12 with a lower steam inlet 14. An enclosure 16 within the housing 12 supports a plurality of tray stacks or assemblies 18 embodying the present invention. An inlet 20 is provided at the top of the deaerator housing 12 for admitting feedwater to a water box 22. A plurality of nozzles 24 are mounted on the bottom of the water box 22. The nozzles 24 are operable to discharge feedwater from the box 22 and direct the feedwater in a conical pattern downwardly toward the underlying tray stacks 18. Water flowing from the stacks 18 exits at an open bottom of the enclosures 16, while steam rising from the stacks 18 in countercurrent relationship to the falling feedwater is discharged from the enclosure 16 by means of a vent 26. As thus far described the operation of the deaerator 10 is similar to that described and illustrated in the aforesaid U.S. Pat. No. 4,759,315.

Figure 2:
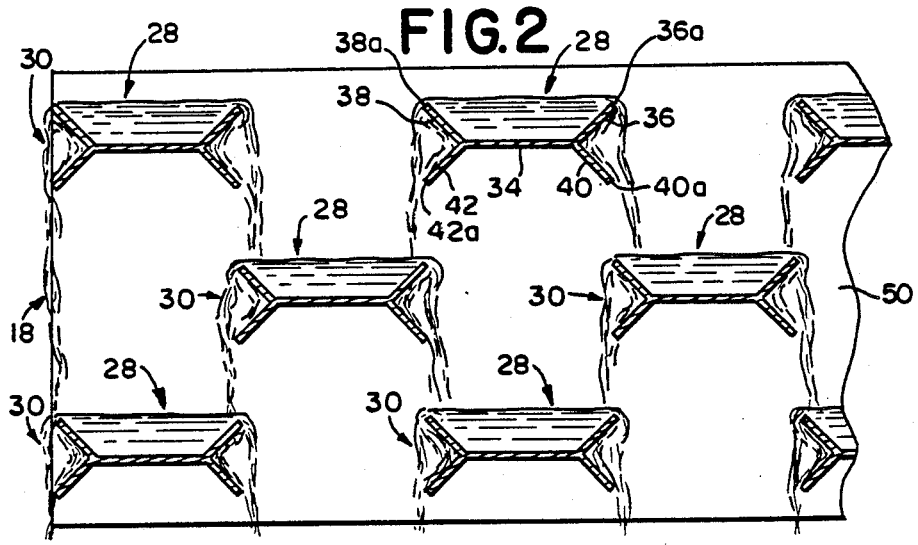
FIG. 2 is a fractional side elevational view of the tray assembly shown in FIG. 1, illustrating the configuration of the upper and lower lip construction for the novel trays and the resulting pattern of overflow water from the trays.

Referring to FIG. 2 it will be seen that each of the tray assemblies or stacks 18 comprises a plurality of troughs 28 that are arranged in spaced, parallel, side-by-side relationship in three horizontal tiers 30. The tiers 30 are vertically spaced from each other and offset such that each of the troughs 28 is generally centered about a vertical plane equidistant between the two adjacent, overlying troughs 28 and thus good water dispersion and tray performance are attained. The elongated troughs 28 each includes a flat bottom 34 and a spaced pair of sides 36 and 38 which extend outwardly and upwardly terminating in upper spilling edges 36a and 38a respectively. A pair of flat inclined wall members 40 and 42 which extend outwardly and downwardly are directly connected to the sides 36 and 38 of the troughs below the upper spilling edges 36a and 38a. It will be noted that the sides 36 and 38 are connected to the bottom 34 at a similar acute angle with respect to the horizontal. It will also be noted that the wall members 40 and 42 likewise are connected to the bottom 34 at an acute angle with respect to the horizontal. The pair of members 36 and 40 and 38 and 42 form opposed V-shaped structures extending along a plane formed by the opposite edges of the bottom 34.

As may be seen in FIG. 3 the ends of the troughs 28 are connected to a pair of end plates 50 to make up a tray stack 18. The ends of the troughs 28 may be connected to the end plates 50 in any suitable means such as by welding directly to the plates or the flat bottom members 34, FIG. 4, may have their ends provided with flanges (not shown) which can be bolted to the respective end plates 50.

Referring again to FIG. 2 it will be seen that the side members 36 and 38 act as upper lips terminating in the upper spilling edges 36a and 38a over which the water spills and cascades into the next tray below. Any water that does not spill over the edges 36a and 38a will trickle down along the outside surfaces of the members 36 and 38 and along the outside surfaces of the lower members 40 and 42 until it reaches the lower edges 40a and 42a. These lower members 40 and 42 which act in the nature of lower lips will then direct this water into the next tray below. From the foregoing it will be seen that the trays or troughs 28 have two sets of lips, namely a set of upper lips which function as the conventional spilling edges and the lower set of lips which function to deflect the water back into the trays below. With this tray configuration the surface tension has little or no effect in the water flow and the adverse effects caused by the by-passing of water from tray to tray is substantially eliminated resulting in maximum heat transfer. By reason of the high efficiency of heat transfer in this tray design the tray stack may be made smaller. Consequently this will result in a smaller vessel with lower cost.

What is claimed is:

1. A deaerator tray assembly for countercurrent contact of steam system feedwater with uprising steam vapor, comprising:

a plurality of horizontally elongated troughs for receiving a quantity of said feedwater to be deaerated, said troughs each having a bottom and a spaced pair of sides terminating in upper spilling edges, said troughs being arranged in spaced, side-by-side relation in horizontal tiers, said tiers being vertically spaced and staggered from each other; and a plurality of flat inclined wall members each one being directly connected to one of said sides of said troughs below said upper spilling edges, said wall members extending outwardly and downwardly from the respective sides of said troughs and terminating in a lower edge thereby causing the water falling from the lower edge of said wall members to be deflected toward the underlying troughs.

2. The invention of claim 1 wherein each of said wall members has a straight lower edge for guiding the liquid from one tray to another.

3. The invention of claim 2 wherein said elongated troughs have a flat bottom and said sides are inclined outwardly and upwardly at an angle from the horizontal.

4. The invention of claim 2 wherein said wall members are inclined outwardly and downwardly at an angle from the horizontal.

5. The invention of claim 4 wherein said sides and said wall members are inclined at similar angles with respect to the horizontal.

6. The invention of claim 5 wherein said sides and said wall members cooperate to form opposed V-shaped structures extending along a plane formed by the opposite edges of said bottom.

7. A deaerator tray comprising:

horizontally elongated trough means for receiving a quantity of liquid to be deaerated, said trough means having a pair of spaced, elongated sides having upper liquid overflow edges; and guide structure for directing the flow of liquid overflowing from said edges, said guide structure comprising a pair of flat, elongated inclined wall members each directly connected to a respective one of said sides below said upper liquid overflow edges along the length thereof, said wall members extending outwardly away from each other and downwardly away from said respective liquid overflow edges, each said wall member being inclined relative to the vertical and terminating in a lower edge to enhance deaeration of said liquid as the latter is guided down said wall members and falls from said lower edge.

8. The invention of claim 7, wherein said pair of flat wall members have straight lower edges for guiding the liquid from one tray to another.

9. The invention of claim 7 wherein said elongated trough means has a flat bottom and said sides are inclined outwardly and upwardly at an angle from the horizontal.

10. The invention of claim 9 wherein said wall members are inclined outwardly and downwardly at an angle from the horizontal.

11. The invention of claim 10 wherein said sides and said wall members are inclined at similar angles with respect to the horizontal.

12. The invention of claim 11 where said sides and wall members cooperate to form opposed V-shaped structures extending along a plane formed by the opposite edges of said bottom.

* * * * *